United States Patent
Sakashita (10) Patent No.: US 12,040,453 B2
(45) Date of Patent: Jul. 16, 2024

(54) BATTERY AND MANUFACTURING METHOD THEREOF

(71) Applicant: Prime Planet Energy & Solutions, Inc., Tokyo (JP)

(72) Inventor: Yasuhiro Sakashita, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/408,252

(22) Filed: Aug. 20, 2021

(65) Prior Publication Data

US 2022/0077502 A1    Mar. 10, 2022

(30) Foreign Application Priority Data

Sep. 8, 2020  (JP) ................. 2020-150370

(51) Int. Cl.
*H01M 10/0587* (2010.01)
*H01M 10/0525* (2010.01)

(52) U.S. Cl.
CPC ... *H01M 10/0587* (2013.01); *H01M 10/0525* (2013.01); *H01M 2220/20* (2013.01)

(58) Field of Classification Search
CPC ......... H01M 10/0587; H01M 10/0525; H01M 2220/20
USPC .......................................................... 429/94
See application file for complete search history.

(56) References Cited

U.S. PATENT DOCUMENTS

| | | | |
|---|---|---|---|
| 2012/0180308 A1 | 7/2012 | Yamada et al. | |
| 2014/0356724 A1* | 12/2014 | Iwami | H01M 10/052 429/231.4 |
| 2018/0062147 A1 | 3/2018 | Onoda et al. | |
| 2019/0198910 A1 | 6/2019 | Kondo et al. | |
| 2019/0267606 A1* | 8/2019 | Lee | H01M 50/20 |

(Continued)

FOREIGN PATENT DOCUMENTS

| | | |
|---|---|---|
| CN | 103579660 A | 2/2014 |
| CN | 107785620 A | 3/2018 |
| CN | 109328412 A | 2/2019 |

(Continued)

OTHER PUBLICATIONS

Final Office Action in CN Application No. 202110974935.X, dated May 18, 2024, 10pp.

(Continued)

*Primary Examiner* — Jonathan G Jelsma
*Assistant Examiner* — Omar M Kekia
(74) *Attorney, Agent, or Firm* — HAUPTMAN HAM, LLP (57) ABSTRACT

A battery is provided which can attain a high space efficiency in a battery case, and is excellent in insertability of a wound electrode body into the battery case during manufacturing. The battery herein disclosed includes a rectangular battery case and a wound electrode body including an electrode. The electrode has a long collector and mixture material layers. The electrode has alternately flat first surfaces stacked in the main surface direction of the wound electrode body and second surfaces stacked in the side surface direction of the wound electrode body. A thickness ratio B/A is 0.1 or less, where A represents an average thickness of the mixture material layers present on the first surfaces and B represents an average thickness of the mixture material layers present on the second surfaces.

3 Claims, 4 Drawing Sheets

(56) References Cited

U.S. PATENT DOCUMENTS

2019/0267608 A1* 8/2019 Choi .................. H01M 4/139
2019/0334158 A1* 10/2019 Choi .................. H01M 4/139

FOREIGN PATENT DOCUMENTS

| | | | |
|---|---|---|---|
| CN | 110140238 A | 8/2019 | |
| JP | H7153490 A | 6/1995 | |
| JP | 200487228 A | 3/2004 | |
| JP | 201086717 A | 4/2010 | |
| JP | 201114238 A | 1/2011 | |
| JP | 201424662 A | 2/2014 | |
| JP | 2019-114423 A | 7/2019 | |
| WO | 2011/036737 A1 | 3/2011 | |

OTHER PUBLICATIONS

Gong et al., Battery Repair Guidelines, dated Jun. 30, 2011, pp. 155-156, 3pp.

* cited by examiner

BATTERY AND MANUFACTURING METHOD THEREOF

BACKGROUND OF THE INVENTION

1. Field of the Invention

The present disclosure relates to a battery and a manufacturing method thereof. The present application claims the priority based on Japanese Patent Application No. 2020-150370 filed on Sep. 8, 2020, the entire contents of which are incorporated in the present specification by reference.

2. Description of the Related Art

In recent years, a battery, particularly, a nonaqueous electrolyte secondary battery such as a lithium ion secondary battery has been suitably used as a potable power supply for a personal computer, a portable terminal, and the like, and as a vehicle driving power supply for an electric vehicle (EV), a hybrid vehicle (HV), and a plug-in hybrid vehicle (PHV), and the like, or in other uses.

Generally, a nonaqueous electrolyte secondary battery has an electrode body including a positive electrode and a negative electrode that are stacked, with a separator interposed therebetween. Electrode bodies are largely classified into a wound electrode body and a stacked type electrode body. As the wound electrode body, a flat-shaped wound electrode body is known (e.g., see Japanese Patent Application Publication No. 2019-114423). Japanese Patent Application Publication No. 2019-114423 discloses a battery, in which a wound electrode body in a shape having two semicircular R parts at the ends of the flat part having a rectangular shape in a cross sectional view, is accommodated in a rectangular battery case.

SUMMARY OF THE INVENTION

With more and more nonaqueous electrolyte secondary batteries being used, the performance thereof is required to enhance further. The present inventors have conducted an intensive study thereon, and consequently found that the related art has room for improvement with regard to the space efficiency in the battery case. Further, the present inventors have found that the wound electrode body as described above has room for improvement with regard to the ease of insertion into the battery case during battery manufacturing.

Under such circumstances, it is an object of the present disclosure to provide a battery that is capable of attaining a high space efficiency in a battery case, and excellent in insertability of a wound electrode body into a battery case during manufacturing.

The battery herein disclosed includes a rectangular battery case, and a wound electrode body including electrodes. The electrode includes a long collector, and mixture material layers. The electrode has flat first surfaces stacked in the direction of the main surface of the wound electrode body and second surfaces stacked in the direction of the side surface of the wound electrode body, alternately. A thickness ratio B/A is 0.1 or less, where A denotes an average thickness of the mixture material layers present on the first surfaces and B denotes an average thickness of the mixture material layer present on the second surfaces. Such a configuration provides a battery that is capable of attaining a high space efficiency in a battery case and excellent in insertability of a wound electrode body into a battery case during manufacturing.

In accordance with one desirable aspect of the battery herein disclosed, the average thickness of the mixture material layers present on the second surfaces is 0. With such a configuration, a higher space efficiency can be attained.

The method of manufacturing a battery herein disclosed is a method of manufacturing a battery including a rectangular battery case and a wound electrode body. The method includes the steps of: preparing an electrode including a long collector and mixture material layers, the electrode having first surfaces and second surfaces in a longitudinal direction so that a thickness ratio B/A is 0.1 or less, where A represents an average thickness of the mixture material layers present on the first surfaces and B represents an average thickness of the mixture material layers present on the second surfaces, and so that a dimension of each second surface in the longitudinal direction gradually increases from a winding start part to a winding end part so as to allow the second surfaces to overlap each other when the electrode is wound; winding the electrode together with a separator around a cylindrical shaft to form a wound body with the first surfaces overlapping each other and the second surfaces overlapping each other, respectively; pressing a central part, in an outer circumferential direction, of an overlapping part of the first surfaces of the wound body to obtain a wound electrode body; accommodating the wound electrode body in the rectangular battery case; and introducing a nonaqueous electrolyte into the battery case. With such a configuration, it is possible to manufacture a battery capable of attaining a high space efficiency in a battery case. Further, the insertability of the wound electrode body into the battery case is also excellent.

In accordance with one desirable aspect of the battery herein disclosed, the average thickness of the mixture material layers present on the second surfaces is 0. With such a configuration, it is possible to manufacture a battery capable of attaining a higher space efficiency in the battery case.

In accordance with another desirable aspect of the battery herein disclosed, at least of a part of the second surfaces to be an inner circumferential side of the wound body is subjected to processing of removing the mixture material layers by a laser, and at least a part of the second surface to be an outer circumferential side of the wound body is subjected to pattern coating, to reduce a mixture material amount thereof than that of the first surfaces. With such a configuration, it is possible to more easily manufacture a battery that is capable of attaining a high space efficiency in a battery case and also excellent in insertability of a wound electrode body into the battery case, and the manufacturing cost is also excellent. Further, it is easy to increase the thickness of the wound electrode body, and it is possible to manufacture a battery with a larger capacity.

DESCRIPTION OF THE PREFERRED EMBODIMENTS

Below, referring to the accompanying drawings, embodiments in accordance with the present disclosure will be described. It should be noted that matters which is not referred to in the present specification and is necessary to implement the present disclosure can be grasped as design matters of those skilled in the art based on the related art in the present field. The present disclosure can be implemented based on the contents disclosed in the present specification, and the technical common sense in the present field. Further, in the following drawings, the members/parts producing the same effect are given the same reference number and sign for description. Furthermore, the dimensional relation (such as length, width, or thickness) in each drawing does not reflect the actual dimensional relation.

Figure 1:
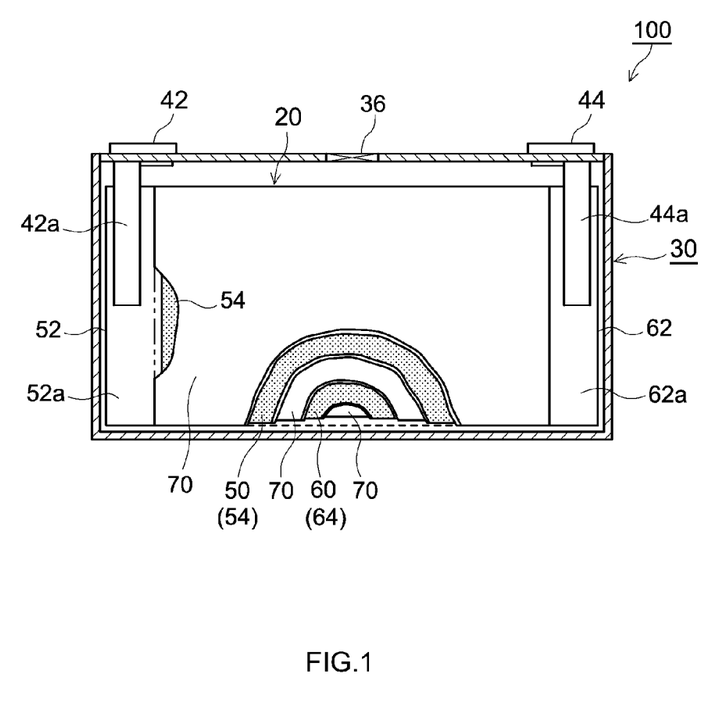
FIG. 1 is a cross sectional view schematically showing an internal structure of a lithium ion secondary battery in accordance with one embodiment of the present disclosure.

FIG. 1 is a cross sectional view schematically showing the configuration of a lithium ion secondary battery 100 of one example of a battery in accordance with the present embodiment. It should be noted that in the present specification, a term "secondary battery" denotes an electric storage device capable of being repeatedly charged and discharged, and is a term encompassing a so-called storage battery, and an electric storage element such as an electric double layer capacitor. Further, in the present specification, the term "lithium ion secondary battery" denotes a secondary battery using lithium ions as electric charge carriers, and implementing charging and discharging by the transfer of electric charges accompanying lithium ions between the positive and negative electrodes.

The lithium ion secondary battery 100 shown in FIG. 1 is a sealed type lithium ion secondary battery constructed by accommodating a wound electrode body 20 having a flat shape and a nonaqueous electrolyte (not shown) in a flat rectangular battery case (i.e., an exterior container) 30. The battery case 30 is provided with a positive electrode terminal 42 and a negative electrode terminal 44 for external connection, and a thin-walled safety valve 36 that is set so as to release the internal pressure when the internal pressure of the battery case 30 increases to a prescribed level, or higher. Further, the battery case 30 is provided with an injection port (not shown) for injecting a nonaqueous electrolyte. The positive electrode terminal 42 is electrically connected with a positive electrode collector plate 42a. The negative electrode terminal 44 is electrically connected with a negative electrode collector plate 44a.

Figure 2:
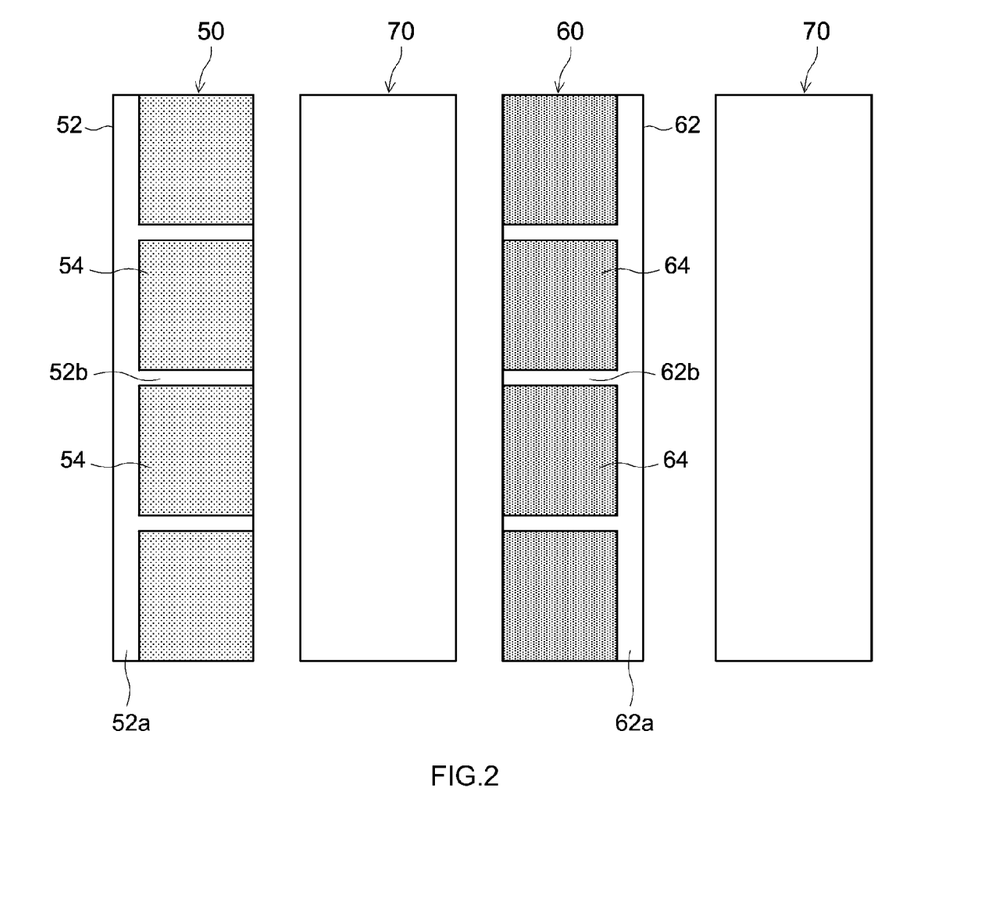
FIG. 2 is a partially exploded view of a wound electrode body included in the lithium ion secondary battery of FIG. 1.
Figure 3:
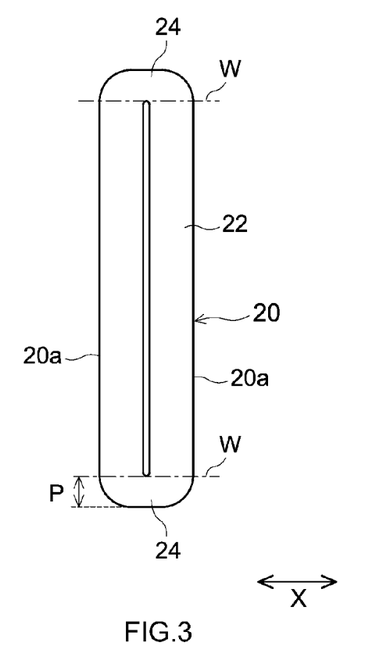
FIG. 3 is a schematic view showing the outline in cross section perpendicular to the winding axis direction of the wound electrode body included in the lithium ion secondary battery of FIG. 1.

FIG. 2 is a partially exploded view of the wound electrode body 20. FIG. 3 is a schematic view showing the outline of the wound electrode body 20 in cross section perpendicular to the winding axis direction of the wound electrode body 20. As shown in FIG. 2, in the wound electrode body 20, a positive electrode sheet 50 and a negative electrode sheet 60 are stacked one on another via two long separator sheets 70. Then, the wound electrode body 20 has a configuration in which the laminated body of these is wound. The number of stacked layers of the wound electrode body 20 (i.e., the number of stacked layers of the positive electrode layers or the negative electrode layers of the wound electrode body) has no particular restriction. Generally, an increase in number of stacked layers of the electrode body can increase the capacity of the battery. On the other hand, the space for collecting current is required, resulting in deterioration of the space efficiency. Therefore, with an increase in number of stacked layers of the wound electrode body 20, the capacity of the battery increases, and the space efficiency improving effect by the present disclosure more increases. Accordingly, the number of stacked layers of the wound electrode body 20 is desirably 90 or more.

As shown in FIG. 3, the wound electrode body 20 has a central flat part 22 having a pair of main flat surfaces 20a. In the cross section of FIG. 3, the central flat part 22 includes the pair of main flat surfaces 20a, and becomes the region between the pair of main flat surfaces 20a. As shown in FIG. 3, when each surface connecting the ends of the pair of main flat surfaces 20a is referred to as plane W, the central flat part 22 is the region defined by the main flat surface 20a and the planes W. The wound electrode body 20 also has side parts 24 at the both ends of the central flat part 22. Specifically, the wound electrode body 20 has two side parts 24 outside between the pair of main flat surfaces 20a (i.e., outside the planes W).

As shown in FIG. 2, the positive electrode sheet 50 has a configuration in which a positive electrode mixture material layer 54 is formed intermittently along the longitudinal direction on one side or both sides (herein, both sides) of the long positive electrode collector 52. The negative electrode sheet 60 also has a configuration in which a negative electrode mixture material layer 64 is formed intermittently along the longitudinal direction on one side or both sides (herein, both sides) of the long negative electrode collector 62.

At one end in the width direction of the positive electrode sheet 50, a first positive electrode mixture material layer non-formation part 52a in which the positive electrode mixture material layer 54 is not formed and the positive electrode collector 52 is exposed is provided. Also at one end in the width direction of the negative electrode sheet 60, a first negative electrode mixture material layer non-formation part 62a in which the negative electrode mixture material layer 64 is not formed and the negative electrode collector 62 is exposed is provided. As shown in FIG. 2, the end provided with the first negative electrode mixture material layer non-formation part 62a is situated opposite to the end provided with the first positive electrode mixture material layer non-formation part 52a. Accordingly, as shown in FIG. 1, the first positive electrode mixture material layer non-formation part 52a and the first negative electrode mixture material layer non-formation part 62a are provided so as to protrude outward from the opposite ends in the winding axis direction (i.e., the sheet width direction) of the wound electrode body 20. The first positive electrode mixture material layer non-formation part 52a and the first negative electrode mixture material layer non-formation part 62a are joined with the positive electrode collector plate 42a and the negative electrode collector plate 44a, respectively.

Further, as shown in FIG. 2, on the positive electrode collector 52, the positive electrode mixture material layer 54 is formed intermittently. For this reason, between the adjacent positive electrode mixture material layers 54, a second positive electrode mixture material layer non-formation part 52b in which the positive electrode collector 52 is exposed is provided. The surface of the positive electrode sheet 50 having the positive electrode mixture material layer 54 becomes a first surface 50a of the positive electrode. The first surface 50a in the wound electrode body 20 is stacked in the main surface direction (the X direction of FIG. 3) of the wound electrode body 20. Namely, the first surface 50a is stacked in substantially parallel with the main surface of the wound electrode body 20. Accordingly, the first surface 50a of the positive electrode is included in the central flat part 22 of the wound electrode body 20. Further, the first surface 50a of the positive electrode is a flat surface. The thickness of the positive electrode mixture material layer 54 on the first surface 50a of the positive electrode is, for example, 20 μm or more, and desirably 50 μm or more, and for example, 300 μm or less, and desirably 200 μm or less.

The second positive electrode mixture material layer non-formation part 52b of the positive electrode sheet 50 shown in FIG. 2 becomes a second surface 50b of the positive electrode. The second surface 50b in the wound electrode body 20 is stacked in the side surface direction of the wound electrode body 20. Accordingly, the second surface 50b of the positive electrode is included in the side parts 24 of the wound electrode body 20. When the positive electrode sheet 50 is spread, the dimension in the longitudinal direction of the second surface 50b of the positive electrode increases gradually from the winding start part to the winding end part.

Similarly, as shown in FIG. 2, the negative electrode mixture material layer 64 is formed intermittently. For this reason, between the adjacent negative electrode mixture material layers 64, a second negative electrode mixture material layer non-formation part 62b in which the negative electrode collector 62 is exposed is provided. The surface of the negative electrode sheet 60 having the negative electrode mixture material layer 64 becomes a first surface 60a of the negative electrode. The first surface 60a in the wound electrode body 20 is stacked in the main surface direction (the X direction of FIG. 3) of the wound electrode body 20. Namely, the first surface 60a is stacked in substantially parallel with the main surface of the wound electrode body 20. Accordingly, the first surface 60a of the negative electrode is included in the central flat part 22 of the wound electrode body 20. Further, the first surface 60a of the negative electrode is a flat surface. The thickness of the negative electrode mixture material layer 64 on the first surface 60a of the negative electrode is, for example, 20 μm or more, and desirably 50 μm or more, and is, for example, 300 μm or less, and desirably 200 μm or less.

The second negative electrode mixture material layer non-formation part 62b of the negative electrode sheet 60 shown in FIG. 2 becomes a second surface 60b of the negative electrode. The second surface 60b of the wound electrode body 20 is stacked in the side surface direction of the wound electrode body 20. Accordingly, the second surface 60b of the negative electrode is included in the side parts 24 of the wound electrode body 20. When the negative electrode sheet 60 is spread, the dimension in the longitudinal direction of the second surface 60b of the negative electrode increases gradually from the winding start part to the winding end part.

A conventional wound electrode body has a shape having two semicircular R parts (side parts) at the ends of a rectangular flat part (central flat part) in a cross sectional view. In contrast, it is configured such that the central flat part 22 of the wound electrode body 20 includes the first surfaces 50a and 60a having the mixture material layers 54 and 64, respectively, and such that the side parts 24 of the wound electrode body 20 include the second surfaces 50b and 60b not having the mixture material layers 54 and 64, respectively as in the present embodiment. As a result, as shown in FIG. 3, in a cross sectional view, for each side part 24, the dimension in the direction protruding from the central flat part 22 (dimension P of FIG. 3) becomes smaller than that of the conventional semicircular side part, resulting in a nearly square shape. Therefore, in a cross sectional view, the wound electrode body 20 comes in a nearly square shape (substantially square shape) as a whole.

Herein, when a rectangular battery case is used as a battery case, the wound electrode body is accommodated in the battery case so that the side part of the wound electrode body is opposed to the bottom surface of the rectangular battery case. With a conventional wound electrode body whose side part is a semicircular R part, the shape of the bottom part of the battery case is different from the shape of the side part (R part). This creates a space between the battery case and the side part (R part) of the wound electrode body. In contrast, in the present embodiment, for the wound electrode body 20, the shape of the bottom part of the rectangular battery case and the shape of the side part of the wound electrode body 20 become close to each other. As a result, even the part where a space has been conventionally created can be occupied by the wound electrode body 20. Accordingly, in the present embodiment, the mixture material layers 54 and 64 can be allowed to be present even at the part of the bottom part of the rectangular battery case where a space has been conventionally created. As a result, it becomes possible to attain a high space efficiency in the battery case.

In addition, in the related art, particularly for a wound electrode body formed in a flat shape by press working, a phenomenon that the thickness is increased by the restoring force possessed by the wound electrode body (so-called spring back) may be caused. For this reason, when the wound electrode body is inserted into the battery case for manufacturing a lithium ion secondary battery, the ease of the insertion (insertability) is reduced. However, in the present embodiment, spring back is less likely to be caused. This results in high insertability of the wound electrode body into the battery case for manufacturing a lithium ion secondary battery.

Further, such effects can also be obtained even when the second surfaces 50b and 60b included in the side parts 24 of the wound electrode body 20 have the mixture material layers 54 and 64 with a small thickness. Thus, the present inventors actually manufactured wound electrode bodies, and conducted a study on the thickness of the mixture material layer on the first surface, and the thickness of the mixture material layer on the second surface. Specifically, each wound electrode body with the ratio of the thickness A of the mixture material layer on the first surface and the thickness B of the mixture material layer on the second surface changed as in the Table 1 below was designed. The dimension P shown in FIG. 3 of the side part of the wound electrode body was measured by taking a X-ray CT photograph. As a result, as shown in the Table 1 below, it has been confirmed as follows: when the ratio B/A of the thickness A of the mixture material layer on the first surface and the thickness B of the mixture material layer on the second surface is 0.1 or less, the side part of the wound electrode body becomes quite flat as compared with the conventional semicircular shape, and comes into a nearly square shape.

TABLE 1

| Thickness A of mixture material layer at first surface (mm) | Thickness B of mixture material layer at second surface (mm) | Ratio B/A | Dimension P of side part (mm) |
|---|---|---|---|
| 0.30 | 0.03 | 0.1 | 0.9 |
| 0.30 | 0.15 | 0.5 | 4.5 |
| 0.30 | 0.30 | 1.0 | 9.0 |

Therefore, the lithium ion secondary battery 100 may have the mixture material layers 54 and 64 at respective second surfaces 50b and 60b of the electrode sheets 50 and 60, respectively. Then, in order to obtain the foregoing effects, in the lithium ion secondary battery 100, for the positive electrode sheet 50, the thickness ratio B/A is 0.1 or less where A represents the average thickness of the positive electrode mixture material layers 54 present on the first surfaces 50a, and B represents the average thickness of the positive electrode mixture material layers 54 present on the second surfaces 50b. Whereas, for the negative electrode sheet 60, the thickness ratio B/A is 0.1 or less where A represents the average thickness of the negative electrode mixture material layers 64 present on the first surfaces 60a, and B represent the average thickness of the negative electrode mixture material layers 64 present on the second surfaces 50b.

It should be noted that respective average thicknesses of the mixture material layers 54 and 64 at respective first surfaces 50a and 60a and second surfaces 50b and 60b can be determined using, for example, a known film thickness measuring device (e.g., a rotary caliper gauge).

Herein as with the example shown, when the second surfaces 50b and 60b of the electrode sheets 50 and 60 do not have the mixture material layers 54 and 64, it can be said that the average thickness A is 0 (zero). When the average thickness A is 0, the shape of each side part 24 of the wound electrode body 20 becomes the closest to the shape of the bottom part of the rectangular battery case 30. Therefore, from the viewpoint of a higher space efficiency, the average thickness A is desirably 0.

Below, a description will be given to the constituent materials for each member of the lithium ion secondary battery 100. As the material for the battery case 30, for example, a metal material which is lightweight and has good thermal conductivity such as aluminum is used.

Examples of the positive electrode collector 52 constituting the positive electrode sheet 50 may include aluminum foil. The positive electrode mixture material layer 54 includes at least a positive electrode active material. Examples of the positive electrode active material may include lithium transition metal composite oxides such as lithium nickel cobalt manganese composite oxide (e.g., $LiNi_{1/3}Co_{1/3}RMn_{1/3}O_2$), lithium nickel composite oxide (e.g., $LiNiO_2$), lithium cobalt composite oxide (e.g., $LiCoO_2$), lithium nickel manganese composite oxide (e.g., $LiNio_5Mm_{1.5}O_4$). The positive electrode mixture material layer 54 can further include a conductive material, a binder, and the like. As the conductive materials, for example, carbon black such as acetylene black (AB), and other carbon materials (such as graphite) can be used. As the binder, for example, polyvinylidene fluoride (PVDF) can be used.

Examples of the negative electrode collector 62 constituting the negative electrode sheet 60 may include copper foil. The negative electrode mixture material layer 64 includes at least a negative electrode active material. Examples of the negative electrode active material may include carbon materials such as graphite, hard carbon, and soft carbon. The negative electrode mixture material layer 64 may further include a binder, a thickener, and the like. As the binder, for example, styrene butadiene rubber (SBR) can be used. As the thickener, for example, carboxymethyl cellulose (CMC) can be used.

As the separators 70, various porous sheets the same as or similar to those to be conventionally used for a lithium ion secondary battery can be used. Examples thereof may include a porous resin sheet formed of a resin such as polyethylene (PE) or polypropylene (PP). Such a porous resin sheet may be a monolayered structure, or may be a multiple layered structure of two or more layers (e.g., a three-layered structure including PP layers stacked on the opposite surfaces of a PE layer). The separator 70 may include a heat resistant layer (HRL).

As the nonaqueous electrolyte, the same ones as those for a conventional lithium ion secondary battery can be used, and typically, those containing a support salt in an organic solvent (nonaqueous solvent) can be used. As the nonaqueous solvents, aprotic solvents such as carbonates, esters, and ethers can be used. Out of these, carbonates are desirable. Examples of carbonates may include ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluoro dimethyl carbonate (TFDMC). Such nonaqueous solvents can be used singly or in appropriate combination of two or more thereof. As the support salts, for example, lithium salts such as $LiPF_6$, $LiBF_4$, and lithium bis(fluorosulfonyl)imide (LiFSI) can be desirably used. The concentration of the support salt is desirably 0.7 mol/L or more and 1.3 mol/L or less.

It should be noted that the nonaqueous electrolyte may include other components than the nonaqueous solvent and the support salt, for example, various additives such as a gas generator, a film forming agent, a dispersant, and a thickener unless they remarkably impair the effects of the present disclosure.

Then, an example of a method of manufacturing a lithium ion secondary battery 100 will be described. The method of manufacturing a lithium ion secondary battery 100 is not limited to the example described below.

A desirable example of the method of manufacturing a lithium ion secondary battery 100 includes a step (electrode preparing step) of preparing electrodes 50, 60 including a long collectors 52, 62 and mixture material layers 54, 64, the electrodes having first surfaces 50a, 60a and second surfaces 50b, 60b alternately in a longitudinal direction so that a thickness ratio B/A is 0.1 or less where A represents an average thickness of the mixture material layers 54 or 64 present on the first surfaces 50a or 60a, and B represents an average thickness of the mixture material layers 54 or 64 present on the second surfaces 50b or 60b, and so that a dimension in the longitudinal direction of the second surfaces 50b, 60b gradually increases from a winding start part to a winding end part so as to allow the second surfaces 50b, 60b to overlap each other when the electrodes 50, 60 are wound; a step (winding step) of winding the electrodes 50, 60 together with a separator 70 around a cylindrical shaft to form a wound body with the first surfaces 50a, 60a and the second surfaces 50b, 60b respectively overlapping each other; a step (pressing step) of pressing a central part in an outer circumferential direction of an overlapping part of the first surfaces 50a, 60a of the wound body to obtain a wound electrode body 20; a step (case accommodating step) of accommodating the wound electrode body 20 in the rectangular battery case 30; and a step (electrolyte introducing step) of introducing a nonaqueous electrolyte into the battery case 30.

At first, the electrode preparing step will be described. The step can be performed, for example, in the following manner First, respective regions to serve as the first surfaces 50a and 60a and the second surfaces 50b and 60b are determined for the long positive electrode collector 52 and the long negative electrode collector 62, respectively so that each dimension in the longitudinal direction of the second surfaces 50b and 60b increases gradually from the winding start part to the winding end part so as to allow the first surfaces 50a and 60a and the second surfaces 50b and 60b to overlap each other, respectively, when the positive electrode 50 and the negative electrode 60 are wound.

For each of the positive electrode 50 and the negative electrode 60, an electrode paste containing an active material and an optional component is prepared. The electrode paste for the positive electrode and the electrode paste for the negative electrode are coated onto the positive electrode collector 52 and the negative electrode collector 62, respectively by a die coater, or the like, and are dried, and if required, are pressed, thereby forming the mixture material layers 54 and 64 on the collectors 52 and 62, respectively. At this step, as a first method, pattern coating is performed so as to reduce each coating amount of respective electrode pastes on the second surfaces 50b and 60b as compared with those on the first surfaces 50a and 60a. Thereby, the mixture material layers 54 and 64 are formed so that the thickness ratio B/A becomes 0.1 or less where A represents the average thickness of the mixture material layers 54 and 64 present on the first surfaces 50a and 60a, and B represent the average thickness of the mixture material layers 54 and 64 present on the second surfaces 50b and 60b. It should be noted that when the coating amount of each electrode paste on the second surfaces 50b and 60b is set at zero, the pattern coating is also referred to as intermittent coating.

Alternatively, as a second method, the mixture material layers 54 and 64 with the same thickness are formed, without varying the coating amounts of the electrode pastes between on the first surfaces 50a and 60a and on the second surfaces 50b and 60b. Processing of removing the mixture material layers 54 and 64 on the second surfaces 50b and 60b by a laser is performed. Thereby, the mixture material layers 54 and 64 are formed so that the thickness ratio B/A becomes 0.1 or less.

The first method and the second method may be combined. Particularly, for the inner circumferential side part of the wound body of the electrode, the dimensions in the longitudinal direction of the second surfaces 50b and 60b are small. For this reason, the second method using a laser is easier to carry out. On the other hand, for the outer circumferential side part of the wound body of the electrode, the dimensions in the longitudinal direction of the second surfaces 50b and 60b are large. For this reason, the first method of performing pattern coating is easier to carry out, and can prevent waste of the mixture material of the electrode. Accordingly, from the viewpoint of more ease of manufacturing and the manufacturing cost of a battery, desirably, at least a part of the second surfaces 50b and 60b to be the inner circumferential side of the wound body is subjected to processing of removing the mixture material layer by a laser, and at least a part of the second surfaces 50b and 60b to be the outer circumferential side of the wound body is reduced in mixture material amount than that on the first surfaces 50a and 60a by pattern coating. In this case, particularly, it is easy to increase the thickness of the wound electrode body 20, and it is easy to manufacture a battery with a larger capacity.

In the manner described up to this point, the positive electrode sheet 50 and the negative electrode sheet 60 as shown in FIG. 2 are manufactured and prepared. Further, in addition to these, two separator sheets 70 are prepared.

Then, the winding step will be described. The step can be performed by, for example, winding the positive electrode sheet 50, the negative electrode sheet 60, and two separator sheets 70 so that the separator sheets 70 are interposed between the positive electrode sheet 50 and the negative electrode sheet 60 using a cylindrical shaft (core member) and a winding machine. At this step, it is configured such that the first positive electrode mixture material layer non-formation part 52a and the first negative electrode mixture material layer non-formation part 62a protrude outward from the opposite ends in the winding axis direction of the wound electrode body 20. The conditions for winding may be known conditions. Use of a cylindrical shaft enables high speed winding, and increases the productivity in contrast to the case using a shaft in a flat shape.

Figure 4:
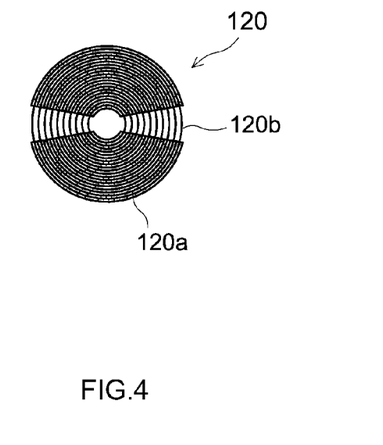
FIG. 4 is a schematic view of one example of a wound body obtained by a winding step of a method of manufacturing a lithium ion secondary battery in accordance with one embodiment of the present disclosure.

By carrying out the step, a cylindrical wound body 120 shown in FIG. 4 can be obtained. The cylindrical wound body 120 has a first lamination layer part 120a including the first surfaces 50a and 60a of the positive electrode sheet 50 and the negative electrode sheet 60 stacked therein, and a second lamination layer part 120b including the second surfaces 50b and 60b of the positive electrode sheet 50 and the negative electrode sheet 60 stacked therein. In the first lamination layer part 120a, the first surfaces 50a of the positive electrode and the first surfaces 60a of the negative electrode are alternately stacked via the separators 70. In the second lamination layer part 120b, the second surfaces 50b of the positive electrode and the second surfaces 60b of the negative electrode are alternately stacked via the separators 70. The first lamination layer part 120a is filled with the layers. Whereas, in the second lamination layer part 120b, a gap is created between the layers.

Then, the pressing step will be described. With the step, for example, the wound body obtained in the winding step is placed sideways in a pressing machine (i.e., so that the winding axis of the wound electrode body 20 becomes in parallel with the stand of the pressing machine). Then, the central part in the outer circumferential direction of the wound body 120 of the first lamination layer part 120a including the first surfaces 50a and 60a stacked one on another therein is pressed. Namely, the wound body 120 is placed in the direction shown in FIG. 4 on the stand of the pressing machine, and is pressed from the vertical direction of FIG. 4. As the pressing machine, a known pressing machine for use in manufacturing a flat-shaped electrode body can be used. The pressing conditions may be known conditions. By carrying out this step, the wound electrode body 20 having the outline as shown in FIG. 3 can be obtained.

Then, the case accommodating step will be described. The step can be carried out according to the known method. Specifically, for example, a lid body of the battery case 30 having an injection port, and the main body of the battery case 30 are prepared. The main body of the battery case 30 has an opening, and the lid body has dimensions covering the opening (see FIG. 1).

The first positive electrode mixture material layer non-formation part 52a and the first negative electrode mixture material layer non-formation part 62a of the wound electrode body 20 are joined with the positive electrode collector plate 42a and the negative electrode collector plate 44a, respectively by ultrasonic joining, resistance welding, laser joining, or the like. To the lid body of the battery case 30, the positive electrode terminal 42 and the positive electrode collector plate 42a are attached so as to establish an electric connection therebetween. Whereas, the negative electrode terminal 44 and the negative electrode collector plate 44a are attached to the lid body of the battery case 30 so as to establish an electric connection therebetween. The positive electrode collector plate 42a and the negative electrode collector plate 44a are joined with the wound electrode body 20, and accordingly, the wound electrode body 20 is attached to the lid body of the battery case 30. The wound electrode body 20 is inserted into the main body of the battery case 30, and the lid body and the main body of the battery case 30 are sealed. The spring back of the wound electrode body 20 is suppressed. For this reason, with the manufacturing method, the insertion operation is easy.

Then, the electrolyte introducing step will be described. The step can be carried out according to the known method by injecting a nonaqueous electrolyte from the injection port of the lid body of the battery case, and sealing the injection port. In this manner, the lithium ion secondary battery 100 can be obtained.

The lithium ion secondary battery 100 enables a high space efficiency in the battery case 30. Further, the lithium ion secondary battery 100 is excellent in insertability of the wound electrode body 20 into the battery case 30 during manufacturing. Further, in the related art, at the R part of the wound electrode body, the mixture material layer may be broken due to application with a bending stress. However, with the lithium ion secondary battery 100, such a problem has also been improved.

The lithium ion secondary battery 100 can be used for various uses. As desirable uses, mention may be made of a driving power supply to be mounted on a vehicle such as an electric vehicle (EV), a hybrid vehicle (HV), or a plug-in hybrid vehicle (PHV). Further, the lithium ion secondary battery 100 can be used as a storage battery for a compact electric power storage device, or the like. The lithium ion secondary battery 100 can also be used typically in a form of a battery pack including a plurality of the batteries connected in series and/or in parallel with each other.

Up to this point, the rectangular lithium ion secondary battery including a flat-shaped wound electrode body has been described as an example. The technology herein disclosed is also applicable to other batteries than the lithium ion secondary battery.

Up to this point, specific examples of the present disclosure were described in detail. However, these are merely examples, and should not be construed as limiting the scope of the appended claims. The technology described in the appended claims includes various modifications and changes of the specific examples exemplified up to this point.

What is claimed is:

1. A method of manufacturing a battery including a rectangular battery case and a wound electrode body, the method comprising the steps of:

preparing an electrode including a long collector and mixture material layers, the electrode having first surfaces and second surfaces alternately along a longitudinal direction so that a thickness ratio B/A is more than 0 and not more than 0.1 or less, where A represents an average thickness of the mixture material layers present on the first surfaces and B represents an average thickness of the mixture material layers present on the second surfaces, at least one of the mixture material layers is present on the second surfaces, and so that a dimension of each second surface in a longitudinal direction gradually increases from a winding start part to a winding end part so as to allow the second surfaces to overlap each other when the electrode is wound;

winding the electrode together with a separator around a cylindrical shaft to form a cylindrical wound body with the first surfaces overlapping each other and the second surfaces overlapping each other, respectively, wherein winding the electrode together comprises forming the second surfaces having flat surface portions;

pressing a central part, in an outer circumferential direction, of an overlapping part of the first surfaces of the wound body to obtain a flat-shaped wound electrode body;

accommodating the wound electrode body in the rectangular battery case; and introducing a nonaqueous electrolyte into the battery case.

2. The method of manufacturing a battery according to claim 1, wherein at least a part of the second surfaces to be an inner circumferential side of the wound body is subjected to processing of removing the mixture material layers by a laser, and at least a part of the second surfaces to be an outer circumferential side of the wound body is subjected to pattern coating, to reduce a mixture material amount thereof than that of the first surfaces.

3. The method of manufacturing a battery according to claim 1, wherein the wound electrode body consists of the first surfaces and the second surfaces.

* * * * *